April 10, 1928.　　　　　　　　　　　　　　1,665,822
S. SHIMIZU
TORSION METER
Filed April 4, 1927
Fig. 1
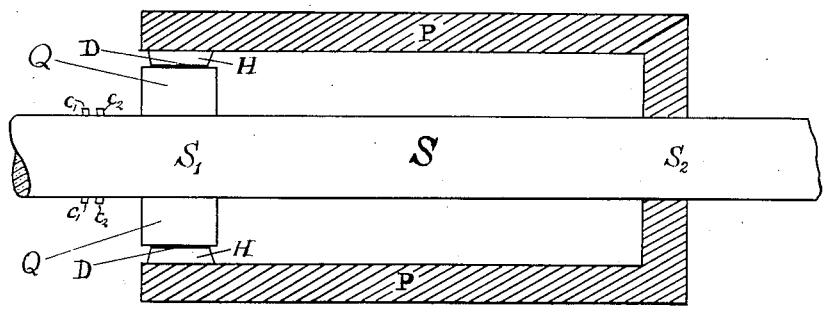
Fig. 2
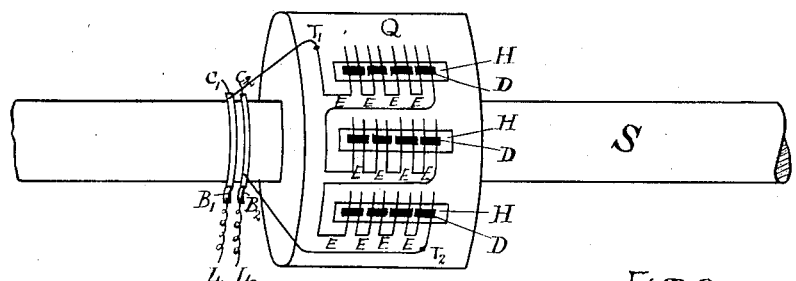
Fig. 3
Fig. 4
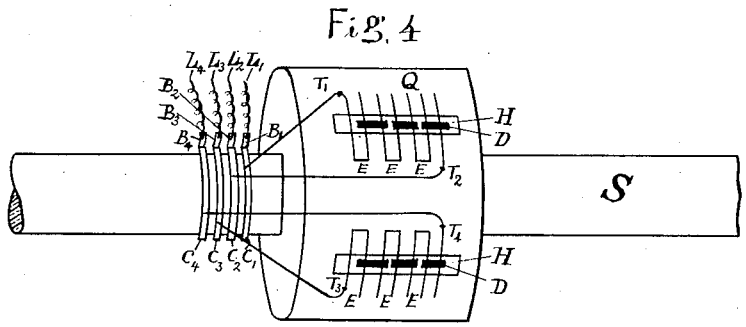
Inventor:
Seizo Shimizu,
By Lewis J. Doolittle,
Atty.

Patented Apr. 10, 1928.

1,665,822

UNITED STATES PATENT OFFICE.

SEIZO SHIMIZU, OF TOKYO, JAPAN.

TORSION METER.

Application filed April 4, 1927, Serial No. 180,920, and in Japan February 18, 1926.

The object of the present invention is to provide a torsion meter by means of which the torsion of the engine shaft, and the power transmitted therethrough, may be determined and indicated at a convenient or distant position, or at different positions, from the engine.

The device embodying this invention is designed to be used as an attachment to an engine shaft to measure the power which is delivered from the engine, by determining the amount of torsion between two points on the shaft by means of the change in the effective amount of electrical resistance in one or more circuits caused by the torsion of the shaft.

In the accompanying drawings, Fig. 1 is a sectional view of the device illustrating my invention; Fig. 2 is a perspective view illustrating diagrammatically one arrangement of electrical resistance conductors mounted on an inner case and the positions of electrical conductive bridge pieces arranged on the inner face of an outer case, which are bridged over the electrical resistance conductors; Fig. 3 is a perspective detail view of a form of one of said bridge pieces, in an enlarged scale; Fig. 4 is a similar view to Fig. 2, showing a modification of the arrangement.

Like letters of reference refer to like parts in the several views of the drawing.

In the drawings, reference character S represents an engine shaft; Q an inner case; P an outer case; and E electrical U-shaped resistance conductors. Along the length of the engine shaft S, the torsion of which is to be measured, two points $S_1$ and $S_2$ (Fig. 1) are chosen and the inner case Q is fixed at the point $S_1$ and the U-shaped resistance conductors E are mounted on its outer surface. Several series each composed of a number of the resistance conductors E are axially arranged and mounted around its circumference. As shown in Fig. 2, slip rings $c_1$ and $c_2$ are suitably mounted on the shaft S and electrically insulated from it. Two terminals $T_1$ and $T_2$ of the resistance conductors E are electrically connected to said rings, $c_1$ and $c_2$, respectively. At the other point $S_2$ on the shaft S is fixed one end of a cylindrical, cup-shaped outer case P and at the inner face of its opposite end are mounted a plurality of series of bridge pieces D, each series being arranged in sliding contact with one of said series of said resistance conductors E on the inner case Q, with a suitable pressure. The conductive bridge pieces D are mounted on electrical insulators H, suitably arranged for each series of the same.

An electric current is supplied to the resistance conductors E through an electrical conductor $L_1$, brush $B_1$, and the slip ring $c_1$, passing through each of the conductive bridge pieces D, resistance conductors E, the slip ring $c_2$, contact brush $B_2$ and conductor $L_2$.

The torsion produced between the two points $S_1$ and $S_2$ of the shaft causes a relative circumferential movement between the outer case P and the inner case Q and all the conductive bridge pieces D are caused to slide on the U-shaped resistance conductors E corresponding to the amount of the torsion. This results in the effective length of the resistance conductors being increased, or decreased, as many times as the total number of the conductors, and their effective electrical resistances are, therefore, changed according to the total amount of the torsion of the shaft.

A measurement of the electrical resistance of the circuit between the two contact brushes $B_1$ and $B_2$ when the shaft has no torsion is made with a suitable device and the change of the electrical resistance when the shaft has torsion provides an indication of the amount of torsion of the shaft.

When the electrical resistance of the path of the current is changed with a change in temperature, a correction thereof may be necessary, except when a conductor made of a material such as manganin is used. If such correction is necessary, it may be predetermined.

The indicator, instead of indicating the change of electrical resistance, may be calibrated to show a direct indication, corresponding to the torsion of the shaft, of the power delivered by the engine. By providing suitable wiring, the indicator may be placed in any desired position, adjacent or distant from the engine, or several indicators, located in different positions, may be provided if desired.

If the Kelvin's double bridge or Wheatstone's bridge is used, a change of the electrical resistance may be easily and directly indicated at any distant place.

In the modification shown in Fig. 4, terminals $T_1$, $T_2$, $T_3$ and $T_4$ are respectively connected to the slip rings $c_1$, $c_2$, $c_3$ and $c_4$, with a reverse arrangement of the resistance conductors E to each other, and then to the conductors $L_1$, $L_2$, $L_3$ and $L_4$ through the brushes $B_1$, $B_2$, $B_3$ and $B_4$, which are, respectively, electrically connected to said rings. The two series of resistance conductors E are in reverse arrangement to each other, so that if either the one between the brushes $B_1$ and $B_2$, or between $B_3$ and $B_4$, increases with a relative movement of the outer case, the other decreases, as will be readily seen from the drawing. The amount of torsion of the shaft S can then be determined from the change of the difference of the resistances, in a similar manner as in the case referred to.

What I claim is:—

A torsion meter for an engine shaft by which the amount of torsion of the shaft can be measured by means of a difference of electrical resistance, comprising an inner case fixed at a predetermined point on the shaft, U-shaped electrical resistance conductors axiallly arranged and mounted in several series on the outer face of said inner case, an outer case fixed at a second predetermined point on said shaft, a plurality of series of conductive bridge pieces arranged on the inner face of said outer case, each series of said bridge pieces being arranged in sliding contact with and to bridge over one of said series of electrical resistance conductors on the inner case, whereby the effective amount of the electrical resistance conductors is changed in accordance with the torsion of the shaft, the measurement thereof being made with a suitable device and the amount of the torsion of the shaft determined therefrom.

Signed at Tokyo, Japan, this 25th day of February, 1927.

SEIZO SHIMIZU.